Aug. 18, 1970     V. TÖRÖK     3,525,032

REGULATING SYSTEM

Filed June 17, 1968     2 Sheets-Sheet 1

INVENTOR.
VILMOS TÖRÖK

BY
Jennings Bailey, Jr

United States Patent Office 3,525,032
Patented Aug. 18, 1970

3,525,032
REGULATING SYSTEM
Viimos Török, Vasteras, Sweden, assignor to Allmanna Svenska Elektriska Aktiebolaget, Vasteras, Sweden, a corporation of Sweden
Filed June 17, 1968, Ser. No. 737,736
Claims priority, application Sweden, June 22, 1967,
8,961/67
Int. Cl. G05f 5/00; H02m 1/08, 7/52
U.S. Cl. 321—18    4 Claims

ABSTRACT OF THE DISCLOSURE

A regulating system for regulating the mean value of an electrical magnitude which varies periodically at a certain frequency, such as an alternating current, has at least one controlled current rectifier which determines such mean value, which can be preset. The actual value of the magnitude is measured by the combination of the integrating circuit fed by the magnitude to be regulated and a division circuit which derives the actual mean value as the ratio between the outputs of the integrating circuit and a time measuring circuit. The integrating and time measuring circuits are cancelled to neutralize both circuits at zero.

BACKGROUND OF THE INVENTION

Field of the invention

The present invention relates to a regulating system for regulating the mean value of an electrical magnitude, said magnitude being periodically variable with a certain frequency. The regulating system comprises a controlled current rectifier the conducting intervals of which determine said mean value and means for presetting a desired mean value and means for measuring the actual mean value of said magnitude.

The prior art

Such a regulating system exists, for example, in a converter which connects an alternating current network with a direct current transmission line and, since the converter is regulated by varying the control angle of the rectifiers of the converter, these rectifiers will be included in the regulating system. It is thus irrelevant whether the converter operates as rectifier or inverter and the controlled magnitude may, for example, be the direct current of the converter or the transmitted power or the frequency of the alternating current network connected to the converter.

Another field where such a regulating system is used is for current control of a load fed from a direct or alternating current source, where the current is fed through one or more controlled rectifiers, the current being regulated by altering the length of the conducting intervals of the converters.

SUMMARY OF THE INVENTION

Previously the instantaneous value of the controlled magnitude has been measured, this measured value passing through a smoothing circuit in order to prevent the periodic variations in magnitude from giving rise to oscillations in the regulating system. Since the time constant for such a smoothing circuit must be considerably greater than the time of the period of the regulated magnitude, the smoothing causes considerable limitation in the control speed of the system, which is a disadvantage.

This disadvantage is avoided by the present invention which is based on the principle of continuous measurement of the mean value of the regulated magnitude within each period by integration of the magnitude so that this mean value $x_m$ appears as a function $$x_m = \frac{1}{t-t_1}\int_{t_1}^{t} x \cdot dt \text{ where } t < t_2$$

Here $t_1$ indicates the point within a period of the regulated magnitude when the measuring starts, whereas $t_2$ indicates the corresponding point within the next period of the regulated magnitude.

A regulating system according to the invention will therefore be characterised in that said mean value measuring means comprises an integrating circuit for the actual value of the magnitude fed by said regulated magnitude, a time measuring circuit and a division circuit for deriving said real mean value as the ratio between the output magnitudes from the integrating circuit and the time measuring circuit, the integrating circuit and the time measuring circuit both being provided with a cancelling circuit to neutralize both said circuits at zero at a certain moment in each period of the regulated magnitude, said system controlling the length of said conducting interval depending on the difference between said desired value and said real value.

The regulating system according to the invention can be modified in such a way that the mean value measuring means according to the invention is parallel-connected with a second mean value measuring means of known type, said first measuring means being series-connected with a high-pass filter, whereas the second is series-connected with a low-pass filter.

BRIEF DESCRIPTION OF THE DRAWINGS

The invention will be further described with reference to the accompanying drawings where FIGS. 1, 3 and 5 show different embodiments and uses of the regulating system according to the invention, while

DESCRIPTION OF THE PREFERRED EMBODIMENTS

Figure 1:
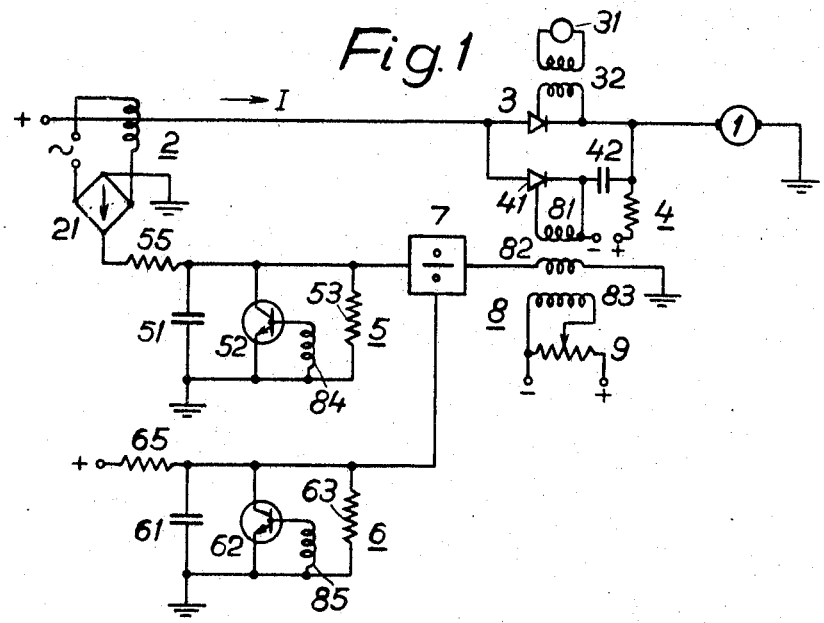
Figure 2:
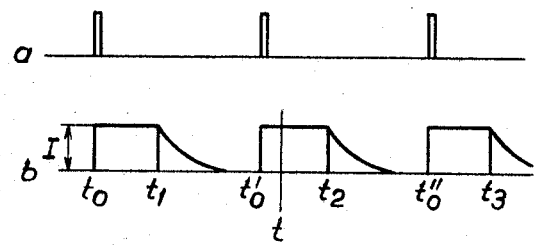
FIGS. 2 and 4 show voltage curves for said regulating system.

FIG. 1 shows a direct current load 1, for example a direct current motor, fed by a direct voltage source through a controlled rectifier, for example a thyristor 3. The thyristor is controlled by a control pulse generator 31 which, over a control voltage transformer 32, is connected to the control electrode of the thyristor. The control pulse generator 31 delivers short control pulses of a certain frequency to the thyristor as shown in FIG. 2a. The thyristor is parallel-connected with an extinguishing circuit 4 consisting of a second thyristor 41 in series with a capacitor 42 over which is connected a charging voltage to charge the capacitor. As long as the thyristor 3 is conducting a constant current will flow through this thyristor and the load 1. When the thyristor 41 ignites with the help of a control pulse from its control voltage transformer 8 the voltage across the capacitor 42 will cause a commutation current in the blocking direction of the thyristor 3 and the direct current will then commutate to the thyristor 41 and the thyristor 3 will be blocked. As the capacitor 42 is recharged the current through the load 1 will decrease to 0, and if the smoothing in the direct current circuit is disregarded a current curve is obtained according to FIG. 2b. The desired current value in the load is set with the help of a bias winding 83 on the transformer 8 fed by a means for presetting the desired mean value, in the form of a potentiometer 9 fed by a constant direct voltage source. Control of the current is carried out with the help of a means for measuring the real mean value, comprising a measuring transductor 2, an integration circuit 5 and a time circuit 6.

The measuring transductor 2 is fed by an alternating voltage source and the output voltage is rectified in a rectifier bridge 21. The voltage from the rectifier bridge 21 charges a capacitor 51 through a low-ohmic resistor 55. The voltage over the capacitor 51 will thus appear across a high-ohmic resistor 53. The capacitor 51 is parallel-connected with a discharging circuit consisting of a transistor 52, the base electrode of which is connected to a transformer winding 84 on the transformer 8. The time circuit 6 is formed in the same way as the integration circuit 5 so that it comprises a capacitor 61 which, through a low-ohmic resistor 65, is charged by a constant direct voltage source so that its voltage appears across the high-ohmic resistor 63. The capacitor 61 is also parallel-connected with a discharging transistor 62 controlled with the help of a transformer winding 85 on the control voltage transformer 8 for the thyristor 41. The output voltages from the circuits 5 and 6 are connected to an electronic division circuit 7 of known type (Handbook of Analog Computation, Electronic Associates, Long Branch, N.J., 1964, page 45) with the help of which the ratio is obtained between the integration value from the circuit 5 and the time value from the circuit 6.

If FIG. 2b is now considered, it is assumed that at the moment $t_0$ the thyristor 3 receives a control pulse and becomes conducting so that a current I flows through the thyristor 3 and the load 1. The control voltage transformer 8 of the thyristor 41 should be considered as an impulse transformer which, at the moment $t_1$, emits a control pulse to the thyristor 41 which then becomes conducting so that, as mentioned previously, the current in the thyristor 3 commutates to the thyristor 41 so that the current I will decrease to 0 as the capacitor 42 is charged. At the same time that a control pulse for the thyristor 41 is induced in its control winding 81, control pulses for the transistors 52 and 62 will be induced in their control windings 84 and 85 and the capacitors 51 and 61 will be discharged. After the moment $t_1$ the output voltage from the measuring transductor 2 will charge the capacitor 51 so that the capacitor voltage across the resistor 53 will at each moment $t$ correspond to the integral of the direct current I from the moment $t_1$. In the same way the capacitor 61 will be charged from its constant charging voltage source so that the voltage across the resistor 63 will simply correspond to the time $t-t_1$. The output voltages from the circuits 5 and 6 will be fed into the division circuit 7 so that the output voltage of this division current will correspond to the mean value of the output voltage from the rectifier bridge 21 and thus the mean value of the direct current I in the load, which means value $I_m$ can be expressed as the function:

$$I_m = \frac{1}{t-t_1} \int_{t_1}^{t} I\, dt$$

It is seen that this mean value will decrease towards the moment $t_0'$, where the thyristor 3 receives an ignition pulse so that the current I again flows through the thyristor 3 and the load 1. Thus the mean value $I_m$, and therefore the output voltage from the division circuit 7, will increase continuously. The output voltage from the division circuit 7 causes a current through the winding 82 on the control voltage transformer 8 and when the ampere turns in this winding are equal to the ampere turns in the winding 83 fed from the means for obtaining the desired mean value 9, an ignition pulse will be induced in the control winding 81 of the thyristor 41 which is thus ignited and causes the thyristor 3 to be extinguished. At the same time the voltages across the capacitors 51 and 61 are cancelled with the help of the transistors 52, 62 and a new integration is initiated.

If the pre-setting of the means for measuring the desired mean value 9 is altered in one direction or the other or if the feeding voltage for the load 1 changes for some reason, it is seen that, during the next period of the current I, the moment $t_2$ when the balance of the ampere turns in the transformer 8 is obtained will alter correspondingly so that during the next period of direct current I the conducting interval $t_0''-t_3$ of the thyristor 3 is altered in a corresponding way. In this manner current alterations for one reason or another will, according to the invention, be compensated during the next subsequent period of the current. Contrary to this, in a regulating system of known type the output signal from the rectifier bridge is taken out over a smoothing circuit, which smoothing circuit will also cause a delay in the function of the regulating system.

Figure 3:
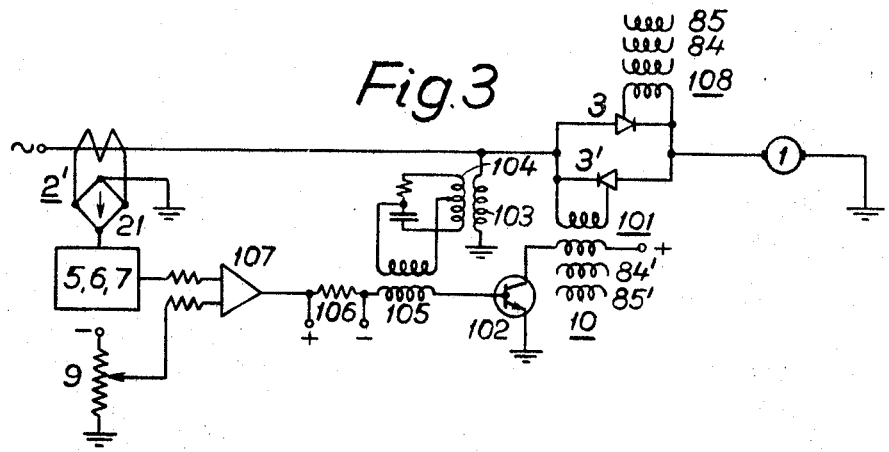

FIG. 3 shows a regulating system for regulating the current in an alternating current load 1 with the help of two anti-parallel connected thyristors 3 and 3'. For the latter of these a control system 10 is shown comprising a control voltage transformer 101, the primary winding of which is connected to a positive direct voltage source and series-connected with a transistor 102. In the control circuit of this transistor three voltages have been series-connected, namely an alternating voltage in a transformer winding 105, a bias voltage in the form of a direct voltage across a resistor 106 and a control voltage from a control amplifier 107. The alternating voltage across the winding 105 is obtained from a voltage transformer 103 connected to the feeding alternating voltage for the load 1 and on the secondary side of which is arranged a phase-displacing device 104 comprising a resistor in series with a capacitor. The primary winding of the transformer 105 is connected between the connection point between said resistor and capacitor and an output on the centre of the secondary winding of the transformer 103, so that the voltage across the winding 105 is displaced 90° in relation to the feeding alternating voltage. The bias voltage 106 is a direct voltage which is equal to the amplitude value of the alternating voltage across the winding 105. To the input side of the regulating amplifier 107 is connected a means for pre-setting the desired mean value in the form of a potentiometer 9 and also a means for measuring the real mean value, of the same design as according to FIG. 1, namely comprising a current transformer 2', which is connected across a rectifier bridge 21 to a combination of circuits 5, 6 and 7 corresponding to the integration circuit, time circuit and division circuit according to FIG. 1.

Figure 4:
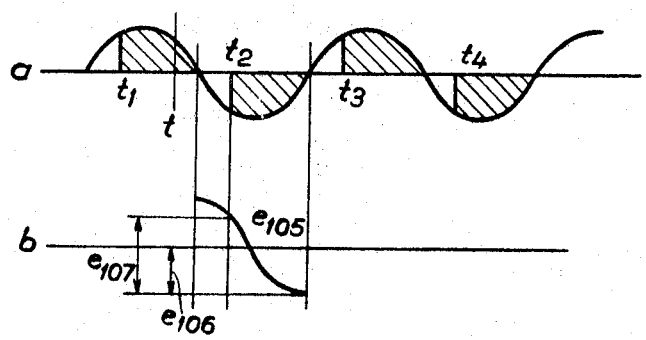

FIG. 4a shows the curve shape for the feeding alternating voltage and FIG. 4b shows the voltages in the control circuit of the transistor 102. For half a period of the feeding alternating voltage in FIG. 4a the alternating voltage across the transformer winding 105 obtain the appearance indicated by the curve $e_{105}$ in FIG. 4b, since the voltage $e_{105}$ is displaced 90° in relation to the feeding alternating voltage. The output voltage $e_{107}$ from the control amplifier 107 is counter-connected to the bias voltage $e_{106}$ across the resistor 106 and when the voltage $e_{105}$ passes the difference between the voltages $e_{107}$ and $e_{106}$, the transistor 102 will have a positive base voltage so that it becomes conducting and a current flows through the transistor 102 and the primary winding of the transformer 101. A control voltage is thus induced for the thyristor 3' in the secondary winding so that the thyristor becomes conducting and its conducting interval has been indicated by the sectioned areas of the negative half period in FIG. 4a. Similarly, the sectioned areas of the positive half period will correspond to conducting intervals of the thyristor 3. On the control voltage transformers 101 and 108 of the thyristors 3' and 3, respectively, control windings 84 and 85 and 84' and 85', respectively, have been indicated for the transistors 52 and 62 in the circuits 5 and 6. In this way the capacitors 51 and 61 in said circuits will be neutralized every time the thyristors receive ignition pulses. At the moment $t_1$ according to FIG. 4a, therefore, the thyristor 3 will receive an ignition pulse and the circuits 5, 6 and 7 commence a continuous calculation of the mean value of the load current in the load 1 and this calculation continues until the moment $t_2$ when the thyristor 3' is to be ignited. The output voltage from the control amplifier 107 will thus always correspond to the mean value of the load current during the previous period of this so that, without the delay of smoothing circuits, it is possible to obtain the real current value to calculate the control angle of each thyristor.

Figure 5:
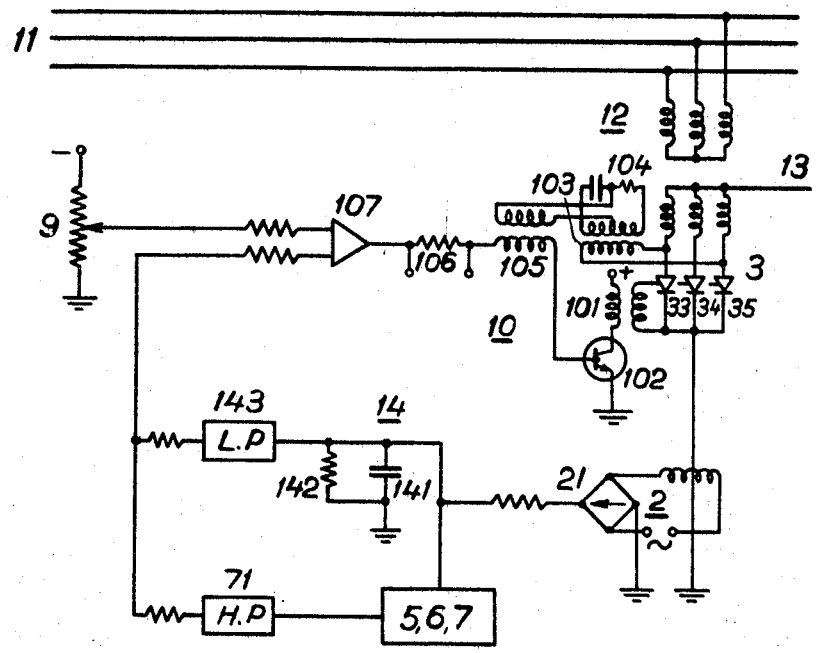

FIG. 5 shows a converter which connects an alternating current network 11 with a direct current transmission line 13. The converter consists of a converter-transformer 12 and a rectifier connection 3. The converter is provided with a control and regulating system built up according to the same principles as in FIG. 3 and the designations are the same as according to FIG. 3. Each rectifier 33, 34, 35 is provided with a control voltage transformer 101 in series with a transistor 102, in the control circuit of which are connected in series the components 105, 106 and 107. The transformer 105 is fed across the phase-displacing device 104 from a voltage transformer 103 connected to the commutation voltage between the rectifier 33 and the previous rectifier 35 in the commutation sequence. The circuit 5, 6, 7 is connected to the rectifier bridge 21 for the measuring transductor 2 with the help of which the direct current of the converter is measured.

The control angle of the rectifiers 33, 34 and 35 will thus be determined in the same way as according to FIG. 4b. The cancelling transistors 52 and 62 in the circuits 5 and 6 are also suitably controlled by arranging their control windings on the control voltage transformers 101 for the rectifiers in the connection 3.

In FIG. 5 the means 5, 6, 7 for measuring the real mean value is parallel-connected with a means 14 for measuring the real mean value, of conventional type. Such a circuit consists of a capacitor 141 parallel-connected with a high-ohmic resistor 142. The direct current of the converter as measured by the measuring transductor 2 consists, as known, of a pure direct current superimposed with an alternating current, the so-called pulsation current, the frequency of which is equal to the frequency of the alternating current network 11 multiplied by the pulse number of the converter, in this case 3. In order to prevent this pulsation current influencing the control amplifier 107 and thus giving rise to oscillations in the regulating system, the capacitor 141 must be so large that the pulsation current is smoothed away. As mentioned previously, however, this smoothing also causes smoothing of possible other alterations in the direct current of the converter so that it has time to alter rather much before the output signal of the control amplifier 107 is altered.

In FIG. 5 the means 5, 6, 7 for measuring the real mean value is series-connected with a high-pass filter 71, whereas the means 14 for measuring the real mean value is series-connected with a low-pass filter 143 and by suitable summation of the output signals from the two means, a combined signal is obtained which reflects both rapid and slow alterations in the direct current of the converter and, in the same way as in FIG. 3, each commutation will be determined with respect to the mean value of the direct current of the previous period of this, i.e. between each two successive commutations.

In the three embodiments shown the current has been taken as the regulating magnitude. However, it is clear that instead of the means 5, 6, 7 and 14 for measuring the real mean value being connected to the current feeding device, they may be connected to a device for measuring power or frequency or other magnitudes which are desired to be used as a base for the regulation.

What is claimed is:
1. Regulating system for regulating the mean value of an electrical magnitude, said magnitude being periodically variable with a certain frequency, said system comprising at least one controlled current rectifier the conducting intervals of which determine said mean value and means for presetting a desired mean value and means for measuring the actual mean value of said magnitude, in which said mean value measuring means comprises an integrating circuit for the actual value of the magnitude fed by said regulated magnitude, a time measuring circuit and a division circuit for deriving said actual mean value as the ratio between the output magnitudes from the integrating circuit and the time measuring circuit, and wherein the integrating circuit and the time measuring circuit are both provided with a cancelling circuit to neutralize both said circuits at zero at a certain moment in each period of the regulated magnitude, said system including means for controlling the length of said conducting interval depending on the difference between said desired value and said real value.

2. Regulating system according to claim 1 for a direct current circuit comprising a controlled current rectifier and an extinguishing circuit connected in parallel thereto, in which said current rectifier is controlled from a control pulse generator which delivers control pulses of a certain frequency, while said extinguishing circuit is controlled by said regulating system by means of control pulses having a certain phase-displacement in relation to the first-mentioned control pulses, and in which said cancelling circuits are controlled by the same control pulses as said extinguishing circuit, said phase displacement being dependent on the difference between said desired value and said actual value.

3. Regulating system according to claim 1, comprising a current rectifier connection connected to an alternating current network, in which said rectifiers are controlled by control pulses with a certain delay angle in relation to the alternating voltage in said network, and in which said cancelling circuits are controlled by the same control pulses as the current rectifiers, said delay angle being dependent on the difference between said desired value and said actual value.

4. Regulating system according to claim 1, in which said mean value measuring means is parallel-connected with a second measuring means to measure the instantaneous value of the regulated magnitude, and in which said first measuring means is series-connected with a high-pass filter, whereas the second measuring means in series-connected with a low-pass filter.

References Cited

UNITED STATES PATENTS

| 3,176,215 | 3/1965 | Kusko. | |
| 3,243,689 | 3/1966 | Perrins | 323—24 X |
| 3,448,371 | 6/1969 | Boymel | 323—24 X |
| 3,458,795 | 7/1969 | Ainsworth | 321—38 X |

OTHER REFERENCES

Cher Vonenkis, Power Transmission by Direct Current, translated from Russian, Israel Program for Scientific Translations, Jerusalem 1963, pp. 52—57.

LEE T. HIX, Primary Examiner

W. H. BEHA, Jr., Assistant Examiner

U.S. Cl. X.R.

321—38; 323—24